US010352709B1

(12) United States Patent
Kalenkovich et al.

(10) Patent No.: US 10,352,709 B1
(45) Date of Patent: Jul. 16, 2019

(54) IDENTIFICATION OF ROAD SEGMENTS (71) Applicant: Amazon Technologies, Inc., Seattle, WA (US)

(72) Inventors: Eugene Kalenkovich, Sammamish, WA (US); Ronald M. Whitman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 15/433,585

(22) Filed: Feb. 15, 2017

(51) Int. Cl.
*G01C 21/32* (2006.01)
*G06F 16/29* (2019.01)

(52) U.S. Cl.
CPC .............. *G01C 21/32* (2013.01); *G06F 16/29* (2019.01)

(58) Field of Classification Search
CPC .......................... G01C 21/32; G06F 17/30241
USPC ........................................................ 701/532
See application file for complete search history.

(56) References Cited

U.S. PATENT DOCUMENTS

| 9,769,616 | B1 * | 9/2017 | Pao | H04W 4/023 |
| 2014/0280318 | A1 * | 9/2014 | Simms | G06F 17/30241 |
| | | | | 707/769 |
| 2015/0215409 | A1 * | 7/2015 | Chow | G06Q 30/0259 |
| | | | | 455/456.3 |
| 2016/0232790 | A1 * | 8/2016 | Massey | B60W 30/08 |
| 2018/0095977 | A1 * | 4/2018 | Reddy | G06F 17/3087 |

* cited by examiner

*Primary Examiner* — Thomas G Black
*Assistant Examiner* — Luat T Huynh
(74) *Attorney, Agent, or Firm* — Lee & Hayes, P.C.

(57) ABSTRACT

Segment signatures for road segments may be generated to enable, among other things, conflation of map data. To generate a segment signature, map data is analyzed to determine road segments represented by the map data. A road segment may be converted into a segment signature to enable comparing road segments between different maps and/or for other reasons. The segment signature may be generated for a road segment and may include truncated geohashes or geohashes including fewer significant digits than more precise geohashes for points along the road segment, thereby designating a small area of land for comparison purposes. The segment signature may include alpha-numeric digits representing a start angle and an end angle of the road segment.

20 Claims, 6 Drawing Sheets

IDENTIFICATION OF ROAD SEGMENTS

BACKGROUND

Map data is widely used for many purposes including navigation purposes, real estate purposes, surveying purposes, and for many other reasons. Map data often includes depiction of roads used by vehicles. Over time, these roads may change due to development, repair, and for other reasons. For example, changes to roads may include addition of new roads, removal of old roads, and/or changes to existing roads. To keep maps current, these changes need to be reflected in current maps, especially maps used for navigation.

One particular challenge in updating maps is determining whether maps include differences, such as different roads or different segments in roads. Although manual inspection and comparison of maps may be performed, this is time consuming and tedious. Comparisons performed by computing devices are often computationally difficult and often results in many false-positive and/or false-negative outcomes, which require additional investigation, resulting in inefficient processes and added expense.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed at least partly to generating segment signatures for road segments to enable, among other things, conflation of map data. To generate a segment signature, map data is obtained and analyzed to determine road segments represented by the map data. A road segment may be defined as a portion of a road between intersecting points along the road. For example, a road segment may include a portion of a road between two consecutive intersections. However, road segments may be defined in other ways to isolate non-overlapping portions of roads for analysis as discussed below. As described herein, the term "road" includes any established path repeatedly used by vehicles or humans to move about an area. Roads may include gravel roads, paved roads, ferry routes, or other types of paths traveled by vehicles. Roads may also include sidewalks, bike paths, and/or other paths traveled by people, possibly using bicycles or other modes of transport.

A comparison of map data may be used for many purposes. For example, data may include satellite imagery, geo traces, direct measurements, accelerometer data, and/or other information may be used to update map data. The data, after some processing, may be used to create a "current" map, which may be compared to existing map data associated with an existing map of the area to determine changes in the roads or changes in other features. As another example, map data associated with different maps may be merged or combined to represent fewer maps or a single map. For example, a map that includes road construction information may be merged with a map that includes traffic flow. To merge the maps, the maps may be processed using at least some of the techniques described below.

A road segment may be converted into a segment signature to enable comparing road segments between different maps and/or for other reasons. The road segment may be defined using a lowered accuracy level that is less than a conventional accuracy level. For example, a geohash may be used to define an area that includes a specific point in a map (or on earth). Geohashes can vary in an amount of area associated with a given geohash, where a larger number of significant digits of the geohash relates to a more precise location and smaller area than an area associated with a geohash that includes fewer significant digits. Reduced accuracy of a geohash, which represents an increased area, may be desirable when comparing data from different maps. For example, a false positive for a segment match (or a false negative for a segment difference) may be avoided by reducing accuracy of a geohash. Thus, it may be desirable to reduce a number of significant digits of a geohash to lower an accuracy level of the geohash to represent a specific point in the area. The geohash may represent an area, such as an approximate rectangle area of land, which may not be an exact rectangle due to curvature associated with latitude and longitude lines. As discussed herein, the term "rectangle" includes an area of land defined by latitude and longitude, and thus may include curvature. For example, a 9-digit geohash may define an approximate 4.8 meter by 4.8 meter area of land. The geohash may be created by truncating or otherwise removing digits from a more precise geohash.

A road segment signature of a road segment identifying start and end points can be computed as a concatenation of geohashes for a start point and an end point, possibly defined as: geohash(start) and geohash(end). For a schema where bidirectional segments are used, these geohashes may be sorted to avoid dependency on what direction was used to define such segment in the source: (e.g., [Geohash(start), Geohash(end)].sort.join).

A 9-digit geohash may define a rectangle giving a small degree of variance from a specific point (e.g., a rough estimation—average of +/−0.8 m), while avoiding false-positives in segment matches or false negatives in segment differences. A road segment signature of start and end points alone, however, may not be sufficient for a comparison, as it will give false-positives for segments with matching start and end points, such as detours, highway service roads.

To avoid these false-positives, use of angles associated with the road segment may be used in the road segment signature. An angle may be determined for a location where the segment starts (either from a defined direction, like north, from a vector or a sequence of points connecting the start and end point, or predefined angles). The angle may be rounded or otherwise "roughed in" to represent a range of angles, such as by representing the angle using a single-digit alpha-numeric representation, which may represent a span of angles (e.g., 0 degrees to 10 degrees, etc.). As an example, an angle value having +/−5 degrees may have an appropriate granularity. To round or "rough-in" the angle, a true angle may be divided by a factor, such as 36. This may then be represented as an alphanumeric digit using 36-base encoding, for example.

An illustrative road segment signature may include at least four components. A first component may be a geohash of a start point of the road segment. A second component may be a geohash of an end point of the road segment. A third component may be a value representing an angle associated with the start point. A fourth component may be a value representing an angle associated with the end point. The fourth component may be defined as a difference from a start angle associated with the start point to avoid some possible false-positives resulting from any roads that have a low angle between them (e.g., service roads and/or entry exit roads which may connect to highways or other roads).

The techniques and systems described herein may be implemented in a number of ways. Example implementations are provided below with reference to the following figures.

Figure 1:
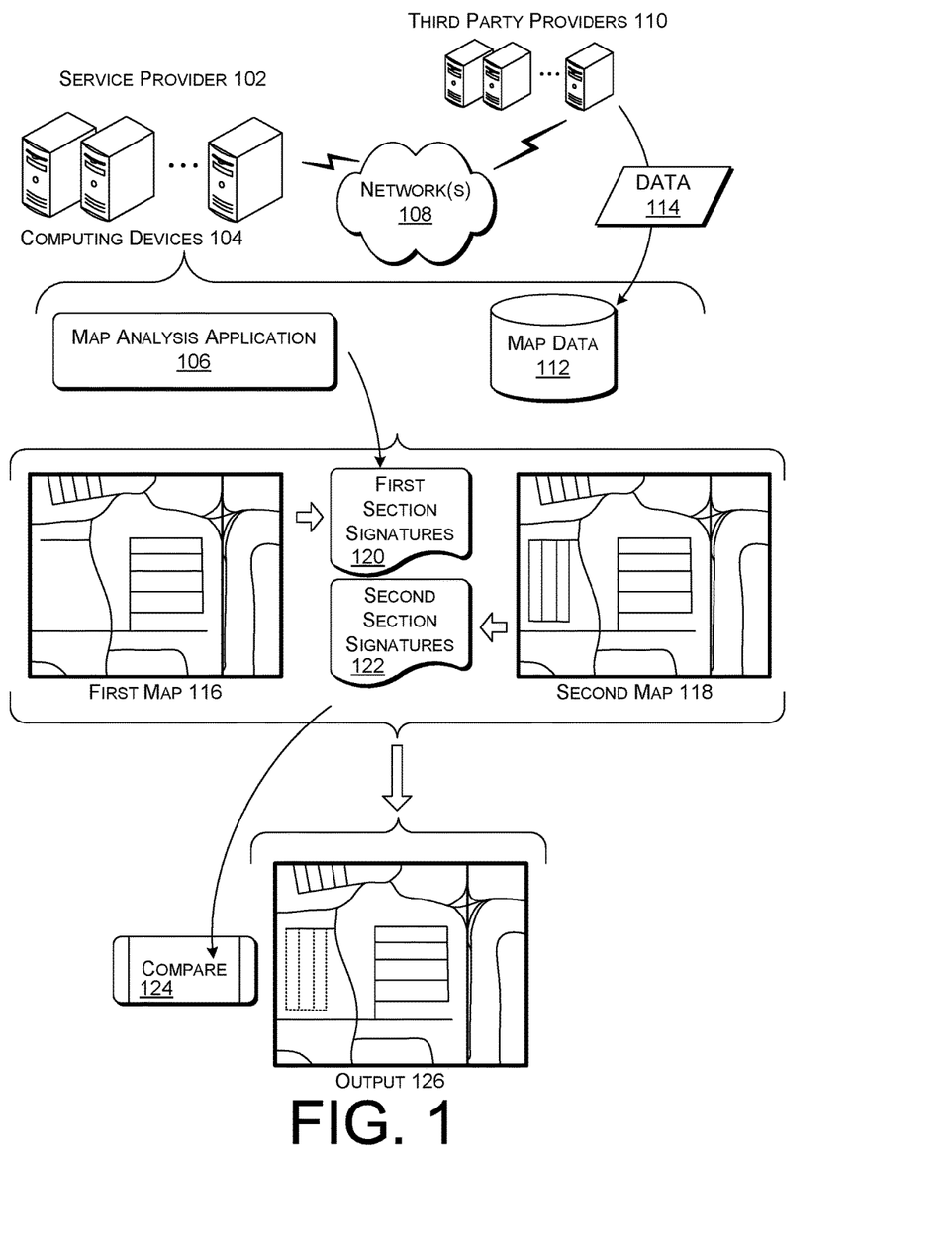
FIG. 1 is a schematic diagram of an illustrative computing environment configured to generate an identification of road segments from map data.

FIG. 1 is a schematic diagram of an illustrative computing environment 100 configured to generate an identification of road segments of a map. The environment 100 may include a service provider 102 that includes computing devices 104 to execute a map analysis application 106. The computing devices 104 may be physical devices, virtual devices, or a combination of both configured in a local or distributed arrangement. For example, the computing devices 104 may be implemented as one or more servers, desktop computers, or other general computing devices. The computing devices 104 may access data via one or more network 108. The network(s) 108 may include wired networks and/or wireless networks.

Via the network(s) 108, the computing devices 104 may access data, such as map data 112, from third party providers 110. In some embodiments, the third party providers 110 may transmit data 114 to populate the map data 112, which may be stored remotely from the computing device 104 or by the computing devices 104. The map data may include maps having roads. In some embodiments, the map data 112 may include images, such as satellite images of areas that include roads. However, the map data may include other data, such as road segments defined between latitude and longitude coordinates, for example.

The computing devices 104 may execute the map analysis application 106. The map analysis application 106 may read data from the map data 112 as inputs to the map analysis application 106, may process the map data 112, and/or may output road segment signatures, among other possible data, which may be stored in the map data 112 or in another data repository.

The following example provides a simplified explanation of operations performed by the map analysis application 106 using the map data 112. The map data 112 may include first data for a first map 116 and second data for a second map 118, which may represent a same area of land or may at least partially overlap an area represented by the first map 116.

The map analysis application 106 may identify road segments in each of the first map 116 and the second map 118. In some embodiments, the road segments may be included in the map data, such as with geohashes that include intersections, start points, end points, and/or other relevant points associated with roads in a map. In some embodiments, the map analysis application 106 may identify or generate geohashes for a map, such as when the map is an image file and does not contain geohash information for all roads, for example. To create geohash information, at least some latitude and longitude coordinates are typically input to the map analysis application 106, such as a latitude and longitude of one or more reference point and/or other reference information. The road segments may be defined by the map analysis application 106 using a consistent definition, such as segments of roads between intersections and segments of roads having endpoints. In this example, the first map 116 and the second map 118 represent a same area of land. However, maps having overlapping areas, but other non-overlapping areas, may suffice. The first map 116 and the second map 118 show a relatively small area of land (e.g., a square mile), but may show larger areas of land that include roads of an entire city, county, state, region, or country, for example. The first map 116 and the second map 118 may show smaller areas of land, depending on the comparison to be performed and the level of detail in the maps. For example, when roads include sidewalks and bike paths, millions of road segments may be present in a map of a large city.

The map analysis application 106 may generate first segment signatures 120 for road segments included in the first map 116. The map analysis application 106 may generate second segment signatures 122 for road segments included in the second map 118. A segment signature may be generated for a segment based on a start point of the segment, an end point of the segment, a first angle associated with the start point, and a second angle associated with the end point. The signature may be an alphanumeric string (or partly numeric and partly alphanumeric string) that includes at least these components.

As an example, the start point and end point may be represented by an x-digit geohash that includes fewer significant digits than a more precise geohash, which extends the x-digit geohash to cover a larger area. The geohash may be broadened by reducing significant digits such that the geohash covers an area having a width greater than a width of a single-lane road or having a width between a width of a single-lane road and a width of a highway, for example.

The first angle may be rounded or "roughed in" to represent a range or span of angles, such as by representing the angle using a single-digit alpha-numeric representation or other digit alpha-numeric representations that represent a range of angles. For example, an angle value having +/−5 degrees may have a good granularity for comparison of road segments without generating excessive amounts of false-positive data that incorrectly suggests that the segment matches another segment. To round or rough in the angle, the true angle may be divided by a factor, such as 36 for use of 36-base encoding. The second angle may be defined in a similar way. In some embodiments, the second angle may be defined based at least in part on the first angle or another angle. This definition of the second angle may further reduce possible false-positives in road segments resulting from roads having low entry and exit angles, such as service roads and/or entries/exits from highways or other roads.

The map analysis application 106 may analyze the first section signatures 120 and/or the second section signatures 122 to determine duplicate segments, among other reasons. In some embodiments, the map analysis application 106 may perform a comparison operation 124 of the first section signatures 120 and the second section signatures 122 to determine changes or differences in the signatures, and thus differences in the first map 116 and the second map 118. This process may be performed relatively quickly since the signatures can be used as indexes which can be compared quickly using existing comparison algorithms.

The map analysis application 106 may generate an output 126, which may be a map 126 or map data, which may indicate differences between the first map 116 and the second map 118. The output 126 may include segments or signatures that are not common between the first section signatures 120 and the second section signatures 122, for example.

Figure 2:
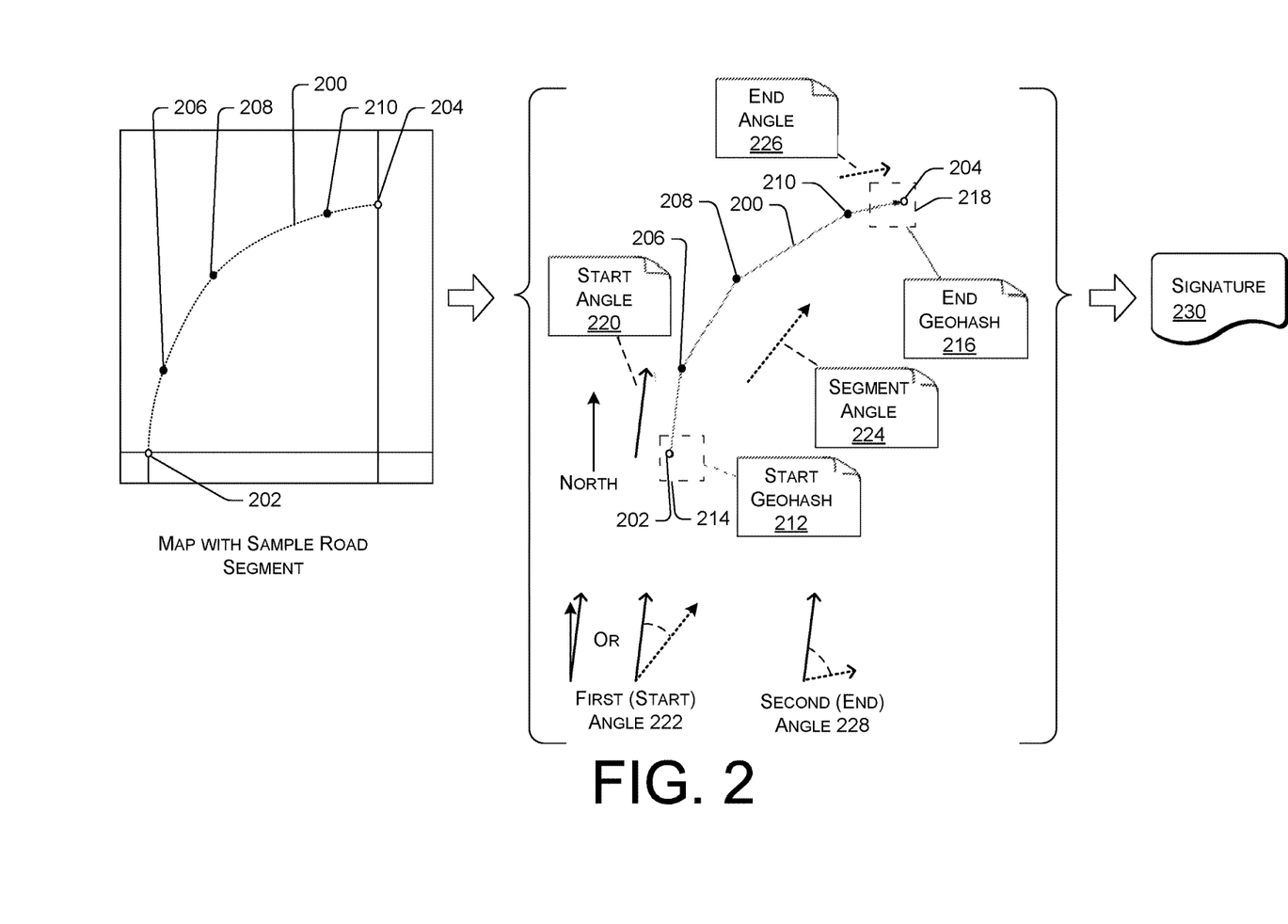
FIG. 2 is a schematic diagram of an illustrative road segment that is used to create a segment signature.

FIG. 2 is a schematic diagram of an illustrative road segment 200 (shown as a dotted line) that is used to create a segment signature. The road segment 200 includes a portion of a road included in a map, which may include other roads. The road segment 200 may span between a first point 202 (e.g., a start point) and a second point 204 (e.g., an end point). The road segment may include intermediate points, such as points 206, 208, and 210, depicted as block dots in FIG. 2, where intermediate point 206 is a point closer to the first point and intermediate point 210 is a point closer to the end point 204. The points 202-210 may represent areas and may be stored as geohashes in the map data and/or may be determined by the map analysis application 106, shown in FIG. 1, based on other information. However, the points may be expressed in other ways, such as by latitude and longitude coordinates. The map analysis application 106 may use rules to define a start and an end of a road segment. A road segment may be defined as a portion of a road between intersections and/or having a termination point (e.g., an end of a road to a first intersection). However, road segments may be defined based on other attributes, such as a distance of a segment, grids applied to the map data, and/or other attributes.

The map having the road segment 200 maybe analyzed by the map analysis application 106 to create components of a segment signature. The map analysis application 106 may obtain or generate a start geohash 212 for the start point 202. The map analysis application 106 may represent the start point 202 as an x-digit geohash that includes fewer significant digits than a more precise geohash having more significant digits, which broadens the geohash to cover a start area 214. The geohash may be broadened by reducing significant digits such that the geohash covers an area having a width between a width of a single-lane road and a width of a highway, for example. Similarly, the map analysis application 106 may obtain or generate an end geohash 216 for the end point 204. The map analysis application 106 may represent the end point 204 as an x-digit geohash that includes fewer significant digits than a more precise geohash, which broadens the geohash to cover an end area 218.

The map analysis application 106 may obtain or generate a start angle 220 associated with the start point 202. In some embodiments, the map analysis application 106 may determine the start angle 220 based on a vector or other segment passing through the start point 202 and the intermediate point 206. The start angle 220 may be represented as a first angle 222. In various embodiments, the first angle 222 may be defined based on a segment angle 224, which may be an angle of a vector or segment spanning between the start point 202 and the end point 204, or between other points along the road segment 200. For example, the first angle 202 may be defined as a difference in degrees between the segment angle 224 and the start angle 220, or as solely the start angle 220 defined in relation to a fixed direction, such as north. The first angle 222 may be rounded or roughed in to represent a range or span of angles, such as by representing the angle using a single-digit alpha-numeric representation or other digit alpha-numeric representations that represent a range of angles. For example, an angle value having +/−5 degrees may have a good granularity for comparison of road segments without generating excessive amounts of false-positive data that incorrectly suggests that the segment matches another segment. To round or rough in the angle, a true angle may be divided by a factor, such as 36 for use of 36-base encoding.

The map analysis application 106 may obtain or generate an end angle 226 associated with the end point 204. In some embodiments, the map analysis application 106 may determine the end angle 226 based on a vector or segment passing through the intermediate point 210 and the end point 204. The end angle 226 may be represented as a second angle 228. In various embodiments, the second angle 228 may be defined based on the first angle 222. For example, the first angle 202 may be defined as a difference in degrees between the first angle 222 and the end angle 226, or as solely the end angle 226 defined in relation to a fixed direction, such as north. The second angle 228 may be rounded or roughed in to represent a range or span of angles, such as by representing the angle using a single-digit alpha-numeric representation or other digit alpha-numeric representations that represent a range of angles.

The components described above may be used to generate a signature 230 for the road segment 200. For example, a first component may be represented by digits of the start geohash 212 that define the start area 214. A second component may be represented by digits of the end geohash 216 that define the start area 218. A third component may be represented by one or more alphanumeric digits representing the first angle 222. A fourth component may be represented by one or more alphanumeric digits representing the first angle 228. The signature 230 may be an alphanumeric or numeric value, or combination of both, which may be used as an index to quickly and efficiently determine if duplicate road segments exist in a map or when comparing data from multiple maps.

Figure 3:
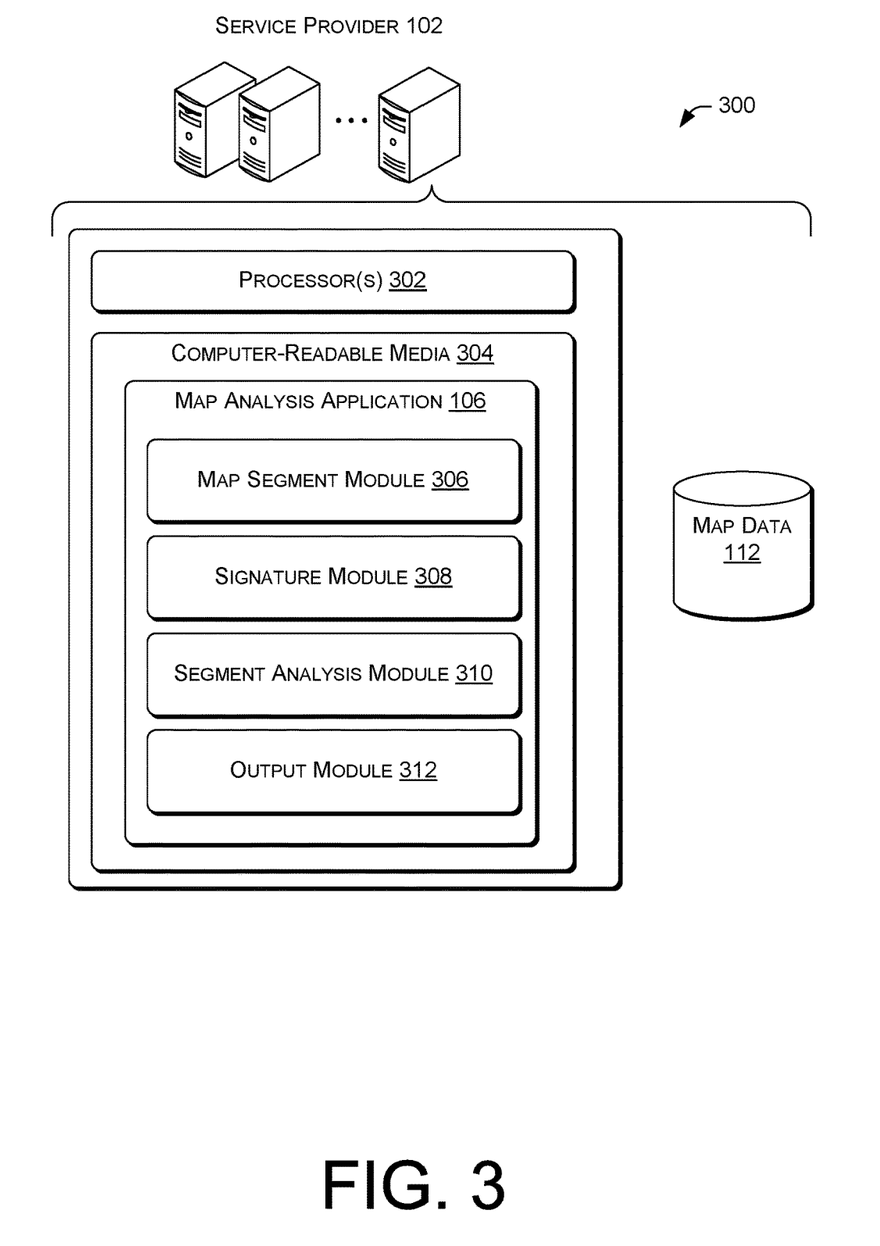
FIG. 3 is a block diagram of an illustrative computing architecture configured to generate aa identification of road segments from map data.

FIG. 3 is a block diagram of an illustrative computing architecture 300 configured to generate an identification of road segments of a map. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the service provider 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 304 may store the map analysis application 106 that may include a map segment module 306, a signature module 308, a segment analysis module 310, and an output module 312, which are described in turn. The components may be stored together or in a distributed arrangement.

The map segment module 306 may obtain or generate segments from the map data. In some embodiments, the map segment module 306 may identify road segments from map data that includes image data. For example, the map segment module 306 may locate or identify points, possibly expressed as latitude and longitude coordinates, that define a segment in a map, such as intersections, termination points or origination points in roads, and/or intermediate points along segments. The intermediate points may be generated as evenly spaced points along a segment, such as a point located a fixed distance along a segment or a fixed percentage along a segment (e.g., ⅓ of the way along a segment or another percentage or fraction along a segment from a given point, such as the start point and/or the end point). In some embodiments, the points may be represented by geohashes. The map segment module 306 may assign geohashes to points that otherwise do not include a geohash. For example, latitude and longitude coordinates representing some points may be converted to geohashes.

The signature module 308 may generate the road segment signature based on the components of a modified start point geohash (having less significant digits than a more precise geohash), a modified end point geohash (having less significant digits than a more precise geohash), a first angle (rounded or roughed in and represented by one or more alphanumeric digits), and a second angle (rounded or roughed in and represented by one or more alphanumeric digits) to create a signature, such as the signature 230 discussed above. In some embodiments, the signature module 308 may generate or create a signature that includes 20 alphanumeric digits, where 9 digits are used for each geohash. However, more or fewer digits may be used in the signature. However, use of a number of digits other than 20 as described above may increase a number of false-positive or false-negative results when generating signatures for a map or comparing segments across different maps.

The segment analysis module 310 may analyze the signatures to identify duplicate signatures and corresponding segments, such as when signatures are generated for a single map. The segment analysis module 310 may be used to compare signatures of different maps to determine segments that are the same between the maps and segments that are different between the maps, depending on an intended use. For example, differences between maps may indicate changes in roads over time if the maps were generated at different times. Similarities between segments may show or determine where particular maps overlap, for example.

The output module 312 may output differences or similarities between maps, depending on an intended result. For example, when differences between maps are desired, and a corresponding input is received by the output module 312, the output module may output a map or an indication of segments (possibly as vectors or signatures) that are different between the maps. An example output is shown as the output 126 shown in FIG. 1.

Figure 4:
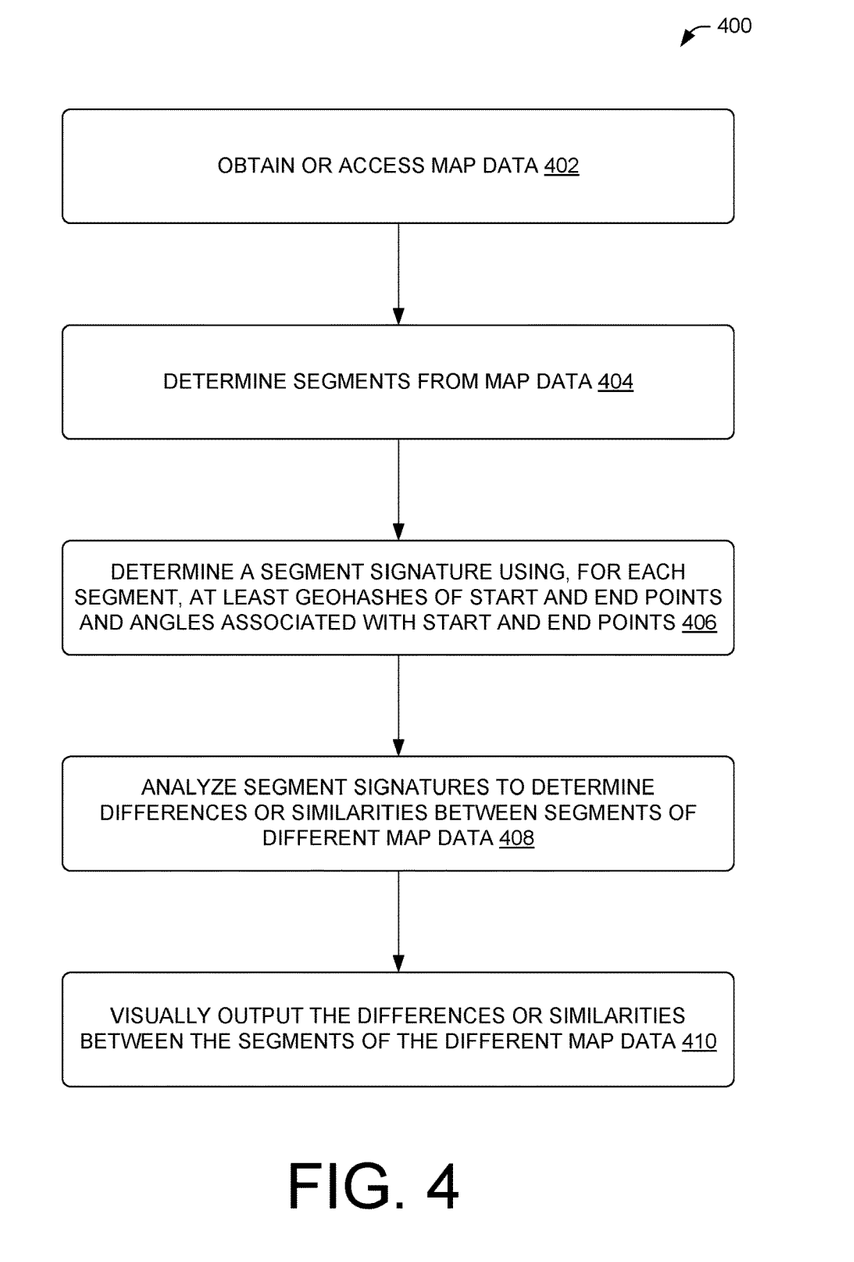
FIG. 4 is a flow diagram of an illustrative process to compare map data using generated segment signatures for road segments from the map data.
Figure 5:
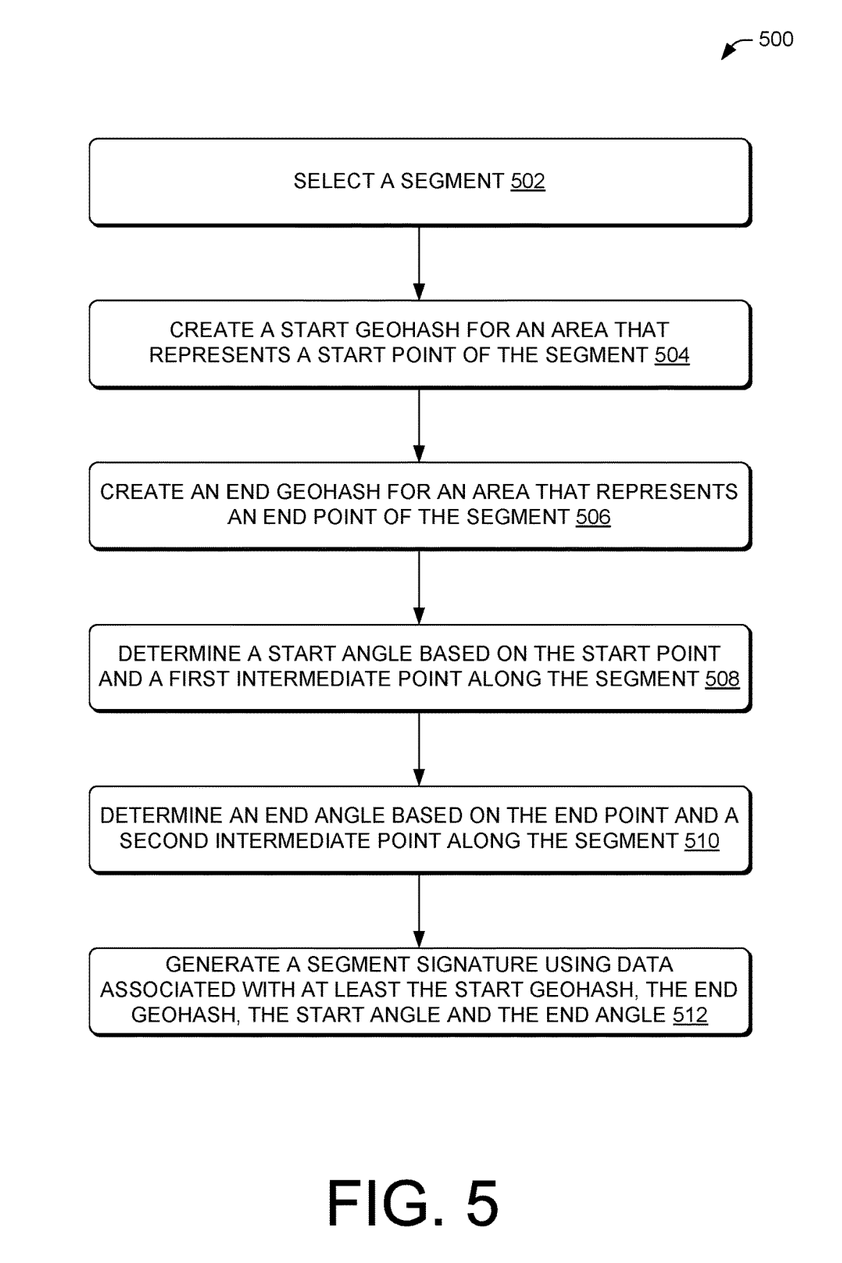
FIG. 5 is a flow diagram of an illustrative process to create an illustrative segment signature for a road segment.
Figure 6:
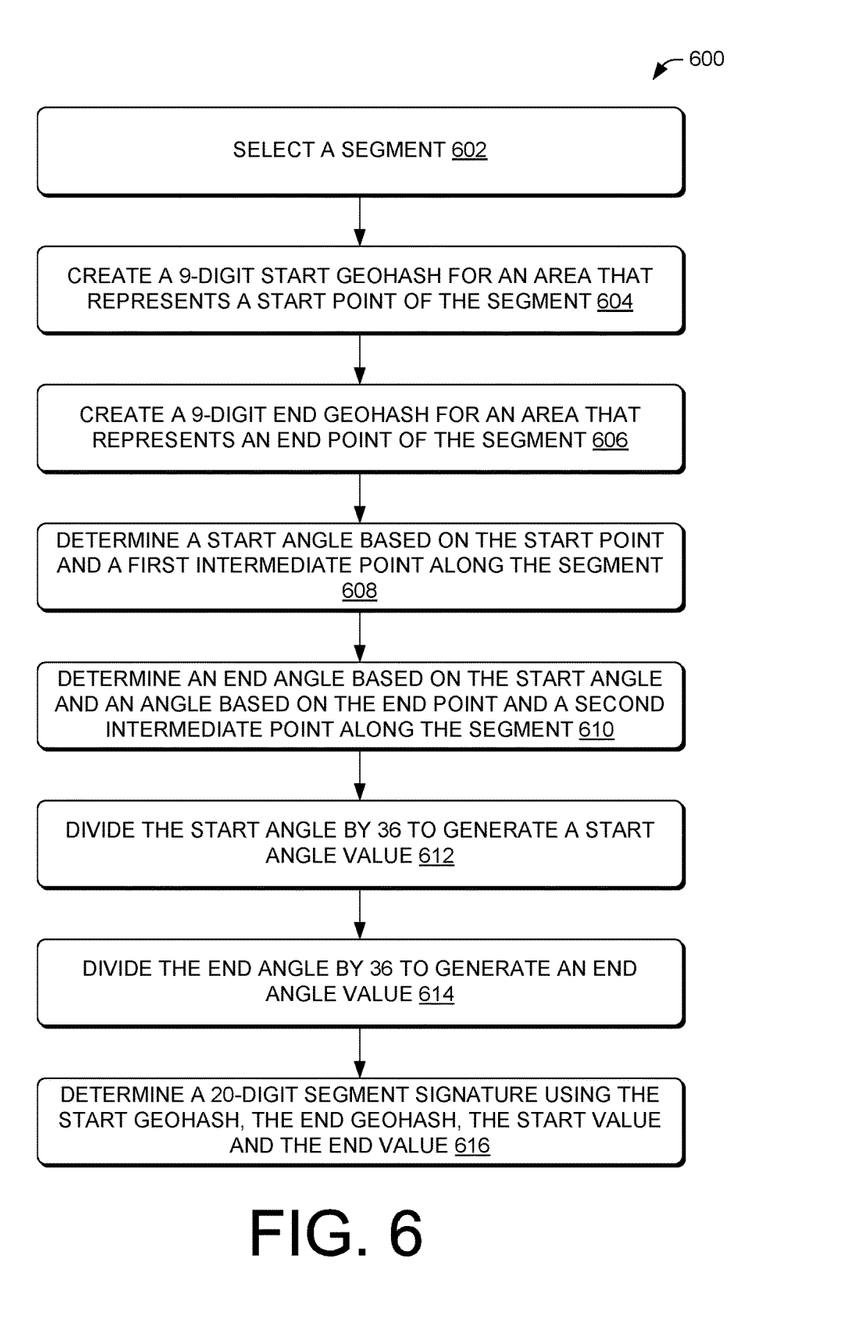
FIG. 6 is a flow diagram of another illustrative process to create an illustrative segment signature for a road segment.

FIGS. 4-6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 4 is a flow diagram of an illustrative process 400 to compare map data using generated segment signatures for road segments from the map data. The process 400 is described with reference to the environment 100 and the architecture 300.

At 402, the map analysis module 106 may obtain or access map data, such as the map data 112. The map data 112 may be stored in a common repository or may be provided to the service provider 102 by other parties, such as the third party providers 110. In some embodiments, the map data 112 may include satellite imagery, geo traces, and/or other information representative of an area of land, water, or both.

At 404, the map segment module 306 may determine segments from the map data 404. In some embodiments, the segments may be predefined and included in the map data 112. However, in some embodiments, the map data 112, such as map imagery, may be analyzed to identify and locate points associated with roads. The points may be used to determine segments using segment definition rules that prevent or minimize overlap of the segments. In some embodiments, the map segment module 306 may determine additional information about segments, such as intermediate points along a segment.

At 406, the signature module 308 may determine a segment signature using, for each segment at least geohashes of start and end points and angles associated with the start and end points. For example, the signature module may truncate a more precise geohash representing a start point or otherwise reduce an accuracy of the geohash to cause the geohash to represent a predefined area. The predefined area may include a width between a width of single-lane road and a width of a highway or at least a width greater than a single-lane road (in single direction). For example, the predefined area may be represented by a geohash having 9 digits. However, the geohash may include more or fewer than 9 digits. The angles may be rounded or roughed in and represented by one or more alphanumeric digits as discussed above with reference to FIG. 2.

At 408, the segment analysis module 310 may analyze segment signatures to determine differences and/or similarities between segments of different map data. For example, the segment analysis module 310 may compare signatures across different map data to determine which segments do not have a counterpart signature in a different map. This information may indicate a new or different road segment between the underlying maps. As another example, segments may be compared within map data of a single map to determine whether segments are unique. This may be used to "clean" or validate data before further analysis is conducted using the segment signatures.

At 410, the output module 312 may output a desired result of an analysis based at least in part on data generated by the segment analysis module 310. For example, the output 312 may be a visual output or image that depicts differences between maps. In some embodiments, the output may be signatures that are not unique in map data for a single map, or signatures that do not include a corresponding signature in comparison map data that represents multiple maps.

FIG. 5 is a flow diagram of an illustrative process 500 to create an illustrative segment signature for a road segment. The process 500 is described with reference to the environment 100 and the architecture 300. The process 500 may be performed by the signature module 308.

At 502, the signature module 308 may select a segment. The segments may be selected using selection rules that identify segments according the segment definition rules, such as a rule that defined a segment in relation to points in the map data (e.g., latitude and longitude coordinates, geohash data, etc.). In some embodiments, segment data may include numeric data that may be processed by the signature module 308. Thus, in some instances, the signature module 308 may not extract data from an actual map or image, but may process information derived from a map or associated with a map, such as latitude and longitude coordinates and/or geohash data.

At 504, the signature module 308 may create a start geohash for an area that represents a start point of the segment. The start geohash may use some, but not all, significant digits from a more precise geohash that represents the start point. By reducing significant digits to create the start geohash, the start geohash may define a larger area rather than a single point on a map (or on earth). The start geohash may be expressed as a predefined number of digits.

At 506, the signature module 308 may create an end geohash for an area that represents an end point of the segment. The end geohash may use some, but not all, significant digits from a more precise geohash that represents the end point. By reducing significant digits to create the end geohash, the end geohash may define a larger area rather than a single point on a map (or on earth). The end geohash may be expressed as a predefined number of digits.

At 508, the signature module 308 may determine a start angle based on the start point and a first intermediate point along the segment. The start angle may be defined relative to a predetermined direction, such as north, or in reference to an angle associated with a vector or segment that joins the start point and the end point, or in reference to another angle or direction.

At 510, the signature module 308 may determine an end angle based on the end point and a second intermediate point along the segment. The end angle may be defined relative to a predetermined direction, such as north, in reference to an angle associated with a vector or segment that joins the start point and the end point, or in reference to the start angle. By defining the end angle with reference to the start angle, certain false-positive data caused by low entry exit roads, such as service roads and entry/exits from highways or other roads, may be avoided.

At 512, the signature module 308 may generate a segment signature using the data associated with at least the start geohash from the operation 504, the end geohash from the operation 506, the first angle from the operation 508, and the end angle from the operation 510. In some embodiments, the angles may be rounded or roughed in and represented by one or more alphanumeric digits. In some embodiments, the signature module 308 may generate the segment signature as a series of ordered digits and/or alphanumeric digits, such as digits for the start geohash, digits for the end geohash, one or more alphanumeric digit for the start angle, and one or more alphanumeric digit for the end angle. However, other orders of the "components" of the segment signature may be used, such as to place the digit(s) corresponding to the angles before the digits corresponding to the start and end point, for example. Other combinations, of course, may also be used when ordering this data to generate the signature.

FIG. 6 is a flow diagram of another illustrative process 600 to create an illustrative segment signature for a road segment. The process 600 is described with reference to the environment 100 and the architecture 300. The process 600 may be performed by the signature module 308.

At 602, the signature module 308 may select a segment. The segments may be selected using selection rules that identify segments according the segment definition rules, such as a rule that defines a segment in relation to points in the map data (e.g., latitude and longitude coordinates, geohash data, etc.). In some embodiments, segment data may include numeric data that may processed by the signature module 308.

At 604, the signature module 308 may create a 9-digit start geohash for an area that represents a start point of the segment. The 9-digit start geohash may be created by truncating digits from a more precise geohash to create a 9-digit geohash. However, the geohash may be created directly by converting a latitude and longitude of the start point to a geohash. The 9-digit start geohash may define an area roughly equal to 4.8 meters by 4.8 meters that includes multiple points, rather than a single point on a map (or on earth).

At 606, the signature module 308 may create a 9-digit end geohash for an area that represents an end point of the segment. The 9-digit end geohash may be created by truncating digits from a more precise geohash to create a 9-digit geohash. However, the geohash may be created directly by converting a latitude and longitude of the start point to a geohash. The 9-digit end geohash may define an area roughly equal to 4.8 meters by 4.8 meters that includes multiple points, rather than a single point on a map (or on earth).

At 608, the signature module 308 may determine a start angle based on the start point and a first intermediate point along the segment. The start angle may be defined based on a reference value, such as north. For example, the start angle may be negative 7 degrees, or 353 degrees using a polar coordinate system. In some embodiments, the start angle may be based on a different reference, such as an angle of a vector or segment that intersects the start point and the end point, or other points along the segment.

At 610, the signature module 308 may determine an end angle based on the end point and a second intermediate point along the segment. In some embodiments, the first intermediate point may be the same location (or point) as the second intermediate point. For example, the first and second intermediate points may be a midpoint of the road segment. The end angle may be defined in relation to the start angle. For example, the start angle may be negative 7 degrees and the end angle may be positive 7 degrees. By defining the end angle based on the start angle, the resulting end angle may be determined to be 14 degrees.

At 612, the signature module 308 may divide the start angle by a factor, such as a factor of 36, to generate a start angle value represented by at least one alphanumeric digit using 36 base-encoding. This may act to round or rough in the angle to cover a span or range of angles.

At 614, the signature module 308 may divide the end angle by the factor, such as the factor of 36, to generate an end angle value represented by at least one alphanumeric digit using 36 base-encoding. This may act to round or rough in the angle to cover a span or range of angles.

At 616, the signature module 308 may generate a segment signature using the data associated with at least the start geohash from the operation 604, the end geohash from the operation 606, the first angle value from the operation 612, and the end angle value from the operation 614. In some embodiments, the signature module 308 may generate the segment signature as a series of ordered digits, such as digits for the start geohash, digits for the end geohash, one or more alphanumeric digit for the start angle, and one or more alphanumeric digit for the end angle. However, other orders of the "components" of the segment signature may be used, such as to place the digit(s) corresponding to the angles before the digits corresponding to the start and end point, for example.

An illustrative segment structure, or data structure, may include the following digits in a signature, although other variations and/or orders of data are possible:
geohash(start, 9),
geohash(end, 9),
base36encode(angle(Vector(start, end), Vector(start, second point))/36), and
base36encode(angle(Vector(start, second point), Vector (point before end, end))/36).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory storing computer-executable instructions that, when executed, causes the one or more processors to perform acts to:
access map data including first map data associated with a first map and second map data associated with a second map, the first map and second map representing at least some overlapping area;
use the first map data and the second map data to analyze road segments of each map as follows:
select a road segment for processing;
create a start geohash for a start area that represents a start point of the road segment;
create an end geohash for an end area that represents an end point of the road segment;
determine a start angle based on the start point and a first intermediate point along the road segment;
determine an end angle based on the end point and at least one of the first intermediate point or a second intermediate point along the road segment;
generate a road segment signature using data associated with at least the start geohash, the end geohash, the start angle and the end angle; and
store the road segment signature with other road segment signatures generated from the first map data and the second map data to create generated road segment signatures; and
analyze the generated road segment signatures to determine differences between road segments of the first map data and the second map data, the differences indicated by unique instances of the generated road segment signatures; and
causing, via a computing device, visual output of at least one of the differences between the road segments of the first map data and the second map data or an image that depicts a single map that is a combination of the first map data and the second map data.

2. The system as recited in claim 1, wherein that start area includes a width that is between a width of a single-lane road and a width of highway.

3. The system as recited in claim 1, wherein the start angle and the end angle are divided by a predetermined factor at least partly to reduce precision of the start angle and end angle.

4. The system as recited in claim 1, wherein the road segment is defined as a plurality of intervening points between at least the start point and the end point of the road segment, the road segment defined to avoid overlapping of road segments in the map data.

5. The system as recited in claim 1, wherein the end angle is defined with reference to the start angle while the start angle is defined with reference to a fixed direction or in reference to an angle of a segment that connects the start point and the end point.

6. The system as recited in claim 1, wherein the computer-executable instructions are further executable by the one or more processors to perform acts to generate the single map based on the differences between the road segments of the first map data and the second map data.

7. A computer-implemented method, comprising:
selecting a road segment;
creating a start geohash for a start area that represents a start point of the road segment;
creating an end geohash for an end area that represents an end point of the road segment;
determining a start angle based on the start point and a first intermediate point along the road segment;
determining an end angle based on the end point and at least one of the first intermediate point or a second intermediate point along the road segment;
generating a segment signature using data associated with at least the start geohash, the end geohash, the start angle, and the end angle; and
causing, via a computing device, visual output of at least one of the segment signature or map data that is associated with the segment signature.

8. The computer-implemented method as recited in claim 7, wherein that start area includes a width that is greater than a width of a single-lane road.

9. The computer-implemented method as recited in claim 7, wherein creating the start geohash includes at least one of truncating a geohash to nine digits or creating a nine-digit geohash from latitude and longitude coordinates that represent the start point.

10. The computer-implemented method as recited in claim 7, further comprising dividing the start angle and the end angle by a predetermined value to represent the angle by one alphanumeric digit or two alphanumeric digits.

11. The computer-implemented method as recited in claim 7, further comprising dividing the start angle and the end angle by thirty six and representing the start angle by a first alphanumeric digit and representing the end angle as a second alphanumeric digit.

12. The computer-implemented method as recited in claim 7, wherein generating the segment signature includes generating twenty digits including numeric digits, alphanumeric digits, or both.

13. The computer-implemented method as recited in claim 7, further comprising analyzing multiple segment signatures representative of different map data to determine at least one of corresponding road segments between the different map data or road segments that do not include a corresponding segment signature in the different map data.

14. The computer-implemented method as recited in claim 7, wherein the road segment is defined by two or more sequences of points that connect the start point to the end point.

15. The computer-implemented method as recited in claim 7, further comprising generating the road segment by converting an image representation of a map to numerical data that is defined, in part, by geohashes or latitude and longitude coordinates.

16. The computer-implemented method as recited in claim 7, wherein the end angle is defined with reference to the start angle.

17. The computer-implemented method as recited in claim 7, wherein the start angle is defined with reference to a fixed direction or in reference to an angle of a segment that intersects the start point and the end point.

18. A system comprising:
   one or more processors; and
   memory storing computer-executable instructions that, when executed, causes the one or more processors to perform acts to:
      select a road segment associated with first map data of a first map and second map data of a second map;
      create at least one of a start geohash for a start area that represents a start point of the road segment or an end geohash for an end area that represents an end point of the road segment;
      determining at least one of:
         a start angle based on the start point and a first intermediate point along the road segment; or
         an end angle based on the end point and at least one of the first intermediate point or a second intermediate point along the road segment;
      generating a segment signature associated with the road segment;
      determining, based on the segment signature, at least one of similarities or differences between one or more road segments of the first map data and the second map data; and
      causing, via a computing device, visual output of at least one of the similarities between the one or more road segments, the differences between the one or more road segments, or an image that depicts a single map that is a combination of the first map data and the second map data.

19. The system as recited in claim 18, wherein the computer-executable instructions are further executable by the one or more processors to perform acts to:
   store the segment signature with other road segment signatures generated from the first map data and the second map data to create generated road segment signatures; and
   analyze the generated road segment signatures to determine the at least one of the similarities or the differences between the one or more road segments of the first map data and the second map data, the differences indicated by unique instances of the generated road segment signatures.

20. The system as recited in claim 18, wherein the computer-executable instructions are further executable by the one or more processors to perform acts to generate the single map based on the at least one of the similarities or the differences between the one or more road segments of the first map data and the second map data.

* * * * *